April 20, 1937.  J. H. DORAN  2,078,128

LOCOMOTIVE DRIVE AND REVERSING MECHANISM

Filed July 6, 1935

Inventor:
John H. Doran,
by Harry E. Dunham
His Attorney.

Patented Apr. 20, 1937

2,078,128

UNITED STATES PATENT OFFICE 2,078,128

LOCOMOTIVE DRIVE AND REVERSING MECHANISM

John H. Doran, Scotia, N. Y., assignor to General Electric Company, a corporation of New York Application July 6, 1935, Serial No. 30,084

1 Claim. (Cl. 74—355)

The present invention relates to locomotive drive and reversing mechanisms and has for its object to provide an improved construction and arrangement of such mechanisms.

For a consideration of what I believe to be novel and my invention, attention is directed to the following description and the claim appended thereto in connection with the accompanying drawing.

Figure 1:
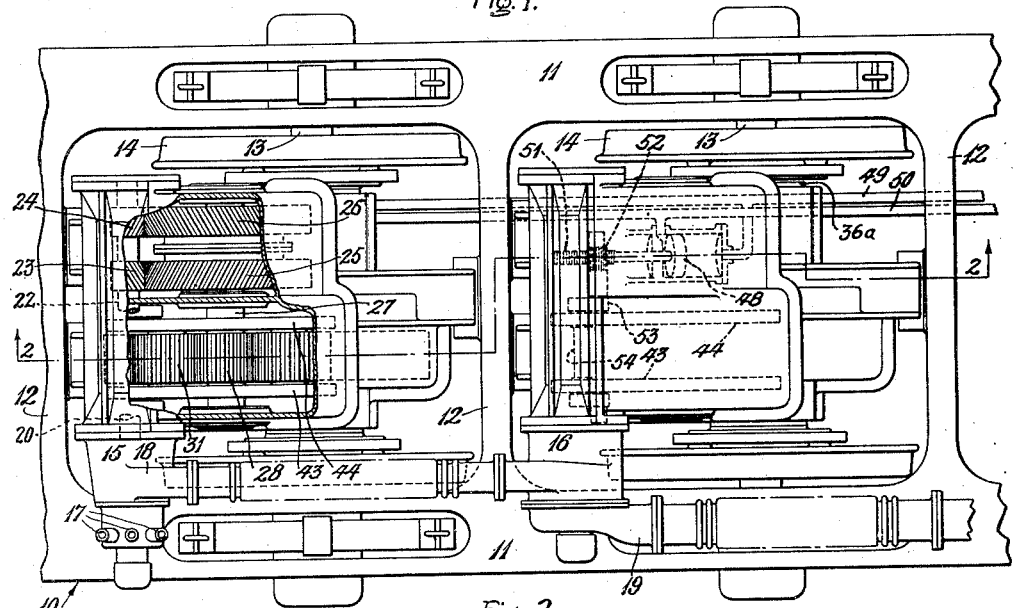
Figure 2:
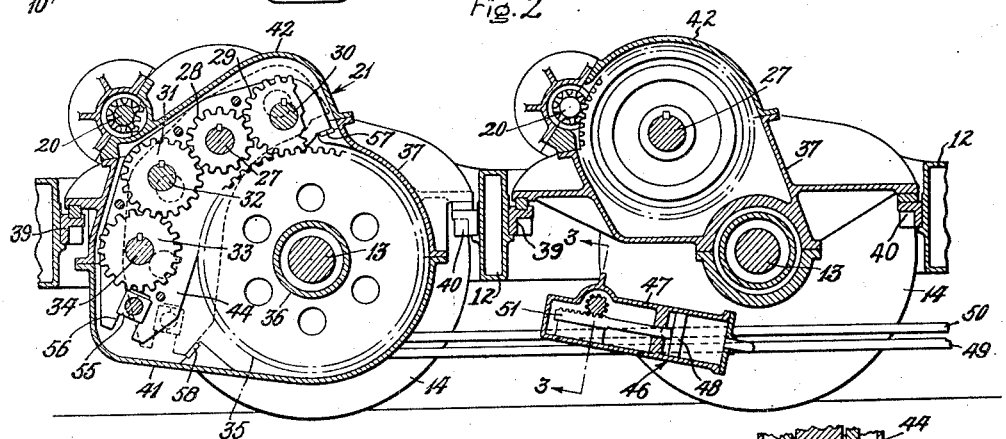
Figure 3:
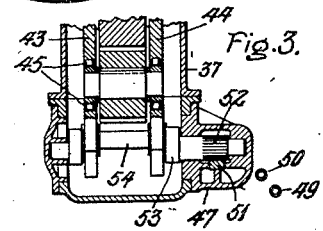

In the drawing, Fig. 1 represents a plan view, partly broken away of a locomotive drive and reversing mechanism embodying my invention; Fig. 2 is a sectional view along lines 2—2 of Fig. 1; and Fig. 3 is a sectional view along line 3—3 of Fig. 2.

The locomotive shown in the drawing includes a frame 10 having two longitudinal members 11 and a plurality of cross members 12. An axle 13 with wheels 14 is provided between pairs of adjacent cross members 12. The arrangement for driving the axles in accordance with my invention comprises a turbine or elastic fluid engine and a gearing for each axle. In the present instance I have shown two turbines 15 and 16 connected in series. The turbine 15 is a high pressure turbine with inlet conduit means 17 and an exhaust conduit 18 connected to the inlet of the medium pressure turbine 16. The latter exhausts into a conduit 19. The provision of a separate turbine for each axle permits a more uniform distribution of load on the different axles. Each turbine has a shaft 20 coupled to the corresponding axle through the intermediary of a combined reducing and reversing gearing 21. Each gearing has a drive shaft 22 connected to and driven by the turbine shaft 20. Two helical gears 23 and 24 are secured to the shaft 22 and mesh with two other helical gears 25 and 26 respectively secured to a shaft 27. The gears 22, 23 and 25, 26 form a speed reducing means. The shaft 27 also carries a small gear 28 which meshes on one side with a forward gear 29 secured to a shaft 30 and on the other side with a reversing gear 31 secured to a shaft 32. The reversing gear 31 engages a gear 33 secured to a shaft 34. The gear 29, and the gear 33 are arranged to cooperate with a driven or axle gear 35 fastened to a quill shaft 36 supported on bearings 36a and surrounding the axle 13 and flexibly connected thereto in a suitable known manner, not shown. In the present instance the gears are positioned so that the forward gear 29 meshes with the driven gear 35. All of the gears are enclosed in a casing. This casing has an intermediate casing portion 37 supported on opposite sides on brackets 39 and 40, the latter being fastened to the corresponding cross members 12. The support on the bracket 39 is substantially rigid, whereas the support on the bracket 40 permits of relative movement necessary due to expansion and contraction during operation. Flanged to the lower end of the intermediate portion of the gearing casing is a lower casing portion 41, and flanged to the upper end of the intermediate portion is an upper casing portion or cover 42. The turbine and the gears 23 and 24 with their shaft 22 are supported on the upper casing portion 42. Whereas the shaft 27 with the gear 28 are supported on the gearing casing, the other gears 29, 31, and 33 with their corresponding shafts are supported on the shaft 27 of the gear 28. This is accomplished by the provision of two swingable gear plates 43 and 44 fulcrumed on the shaft 27 on opposite sides of the gear 28. As shown in Fig. 3, the shaft 34 for the gear 33 is mounted on the gear plates 43 and 44 by the intermediary of anti-friction bearings 45. The other shafts may be similarly mounted on the gear plates. Means are provided to swing or turn the gear plates about the shaft 27 so that in one end position, as shown in the drawing, the forward gear 29 meshes with the driven gear 35 and in the other end position the gear 33 meshes with the driven gear 35. The driven gear 35 is flexibly connected to the axle 13. The gear 35 is carried by the quill shaft 36 which latter is carried by bearings 36a attached to casing 37. The other end position of the gear plates is indicated in Fig. 2 in dotted lines with respect to the positions of the gear plates and the gear shafts. The means for turning the gear plates comprises a hydraulic motor 46 for each axle or gearing. The motor has a casing 47 forming a cylinder with a piston 48 movably disposed therein. Opposite ends of the cylinders are connected to oil supply and drain pipes 49 and 50 respectively. The supply of oil through the pipe 49 and the simultaneous draining of oil through the pipe 50 causes movement of the pistons towards the left and vice versa. The control of the oil supply may be effected in known manner by a pilot valve, not shown. The piston 48 has a stem connected to a toothed rack 51, meshing with a pinion 52. The latter is secured to one end of a crank arm 53. The other end of the crank arm is secured to a pin 54 in cooperative relation with the swingable arms 43 and 44. In the present instance the pin 54 is held on crossheads 55 slidably mounted in recessed or forked end portions 56 of the swingable arms 43 and 44. During operation, movement of the piston 48 towards the right causes counter-clockwise turning of the pinion 52 which in turn effects turning of the crank arms 53, resulting in swinging or turning movement of the swingable plates from the forward position to the rearward or reversing position and vice versa. Stops 57 and 58 (Fig. 2) are provided to limit movement of the swingable arms and to hold these arms in fixed end positions. The stop 57 is engaged by an upper end portion of the swingable arms as soon as these arms have reached the proper forward position and the stop 58 is engaged by the lower end portion of the arms 43 and 44 when they have reached the proper position for reversing operation.

With my invention I have accomplished an improved construction and arrangement for operating drive and reversing mechanisms for locomotives and like machines. The different axles of such locomotives are driven by separate units including a turbine and a gearing. The turbine and the gearing are assembled to form a complete drive and reversing mechanism for each axle. The turbine with the gearing are supported on a single casing. The arrangement permits relative movement between the gearing casing and the locomotive frame, thus rendering the drive unit with respect to each axle independent of relative expansion and contraction of the various parts of a locomotive.

An important feature of the gearing is the provision of swingable or turnable gear plates supporting a plurality of gears. One of them is driven from the turbine directly or through the intermediary of a reducing gearing, and this gear has a shaft mounted on the gearing casing. Forward and reversing gearing means are supported on the swingable plates. The swingable plates of the gearings for driving the different axles are moved together by hydraulic means and their movements are limited and fixed in their end positions by stops formed on the gearing casings.

In the preferred embodiment, as described above, the gear means on the swingable plates of each gearing consist of a first or drive gear driven from the turbine, a forward gear driven from the first gear and another gear driven from the first gear through a reversing gear.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

A gearing unit including a drive gear, a driven gear, forward and reversing gear means for driving the driven gear from the drive gear in either direction of rotation, supporting means including plates with anti-friction bearings on opposite sides of the drive gear for swingably mounting about the center of the drive gear the forward and reversing gear means, and means for turning the supporting means to effect torque transmission through the forward gear means and simultaneously to render inoperative the torque transmission by the reversing gear means and vice versa, the last named means comprising a pin rotatably mounted in bearings in said plates, a crank arm having one end secured to the pin and a pinion fastened to the other end of the crank arm, and stops to fix the end positions of the plates.

JOHN H. DORAN.